United States Patent Office 3,136,766
Patented June 9, 1964

3,136,766
SURFACE ACTIVE ETHERS OF N-(HYDROXY-METHYL)-LACTAMS
Saul R. Buc, deceased, late of Easton, Pa., by Dolores M. Buc, administratrix, Easton, Pa., Raymond L. Mayhew, Phillipsburg, N.J., and Earl P. Williams, Pen Argyl, Pa., assignors to General Aniline & Film Corporation, New York, N.Y., a corporation of Delaware
No Drawing. Filed Nov. 4, 1960, Ser. No. 67,434
6 Claims. (Cl. 260—247.7)

This invention relates to a new class of surfactants and particularly to non-foaming alkali stable surface active ethers of N-(hydroxymethyl)-lactams.

It is known that polyethoxylated phenols and polyethoxylated aliphatic alcohols are useful nonionic surfactants being especially adaptable as wetting agents, emulsifiers, and the like. They are not, however, suitable for formulations requiring the presence of alkaline material. Generally, surfactants of this type are notoriously subject to degradation and discoloration in the presence of an alkaline material such as caustic soda, or caustic potash alone or in combination with an alkali metal silicate. The purpose of adding such alkaline material to surfactants of this type is primarily to decrease surface tension, increase the emulsification ability and also the rate of penetration such as in the wetting of an impervious membrane, i.e., a paint film, grease film, oil film, and the like. In view of this discoloration and degradation, the various polyethoxylated phenols and polyethoxylated aliphatic alcohols have not been employed in the formation of alkaline surfactant compositions.

It is also known that polyethoxylated phenols and polyethoxylated aliphatic alcohols while having excellent detergent characteristics, their use in certain applications is prohibited because of their extremely high foaming characteristics. The latter is particularly manifest in many automatic mechanical applications such as dish washing and clothes washing.

It is an object of the present invention to provide a new class of surfactants which do not discolor or degrade in the presence of alkaline materials and which possess low foaming characteristics that are highly desirable in many surfactant applications.

Other objects and advantages will become more clearly apparent from the following description.

We have discovered that polyethoxylated phenols and polyethoxylated aliphatic alcohols react readily with N-methylollactams in the presence of p-toluene sulfonic acid monohydrate as a catalyst at a temperature of from 80 to 95° C. for a period of time ranging from 4 to 12 hours. By this condensation procedure, surface active ethers of N-(hydroxymethyl)-lactams are obtained which are non-foaming, stable to caustic alkali and mixtures of alkaline materials and are particularly useful where good detergency and low or no foaming is an essential prerequisite. The compounds obtained by this reaction are characterized by the following general formula:

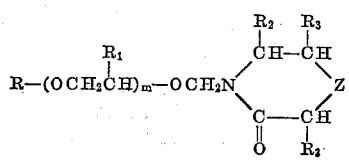

wherein R represents either an alkyl group of 8 to 18 carbon atoms, or a phenyl or naphthyl group substituted by 1 or 2 alkyl groups of 8 to 18 carbon atobms, $R_1$ represents either hydrogen or methyl group and wherein the ethoxy and propoxy units are arranged in any order when both of said units are present, $R_2$, $R_3$ and $R_4$ represent either hydrogen, methyl or ethyl groups, Z represents either a single bond, —$CH_2$— or —O—, and $m$ represents a positive integer of from 2 to 100.

In preparing the new surface active ethers of N-(hydroxymethyl) lactams in accordance with our invention, we take 1 mole of any polyethoxylated phenol, polyethoxylated aliphatic alcohol or mixed polyglycol monoether of phenol or aliphatic alcohols and 1 mole or a slight excess thereof of an N-methylol-lactam together with 0.05 to 0.2 mole of p-toluene sulfonic acid monohydrate and heat the mixture in any suitable flask equipped with a thermometer, stirrer and condenser to a temperature of 80 but not exceeding 95° C. for a period of time ranging from 4 to 12 hours. Thereafter the reaction mass is neutralized by the addition of an organic amine such as tributyl amine, diethanol amine, and the like. The final product is a clear homogeneous light liquid which has excellent detergency and low or no foam together with stability in caustic soda, caustic potash or either one or both of these mixed with alkali metal silicates.

The various polyethoxylated phenols and polyethoxylated aliphatic alcohols which we employ in the foregoing condensation reaction are more fully described in great detail in United States Patents 1,970,578; 2,213,477; 2,575,832; 2,593,112 and 2,676,975, the disclosures of which are incorporated herein by reference thereto as illustrative of such polyglycol monoethers.

Instead of employing polyethoxylated phenols and polyethoxylated aliphatic alcohols from ethylene oxide, we may also employ polypropoxylated phenols and aliphatic alcohols as well as mixed polyglycol monoethers by utilizing mixtures of ethylene oxide with propylene oxide or ethoxylating first followed by propoxylation as will become apparent from the illustrative working examples.

The N-methylol-lactams are readily obtained by reacting 1 mole of a substituted or unsubstituted 2-pyrrolidone, α-piperidone, caprolactam or morpholone with 1 mole of paraformaldehyde calculated as 100% in the presence of .01 to .017 mole of potassium hydroxide pellets. In conducting the reaction, the pyrrolidone, morpholone, etc. is charged to any suitable container such as a glass flask or beaker, the potassium hydroxide pellets added with stirring until dissolved and the paraformaldehyde added rapidly while allowing the heat of the reaction to rise to 80–90° C. After stirring for about 10–20 minutes, the homogeneous melt is poured into trays wherein the N-methylol derivative rapidly crystallizes out. The derivative thus obtained is used as such without any further purification.

To more specifically illustrate this process, with 2-pyrrolidone as an example, 960 mls. (1060 grams) 12.48 moles of 2-pyrrolidone were charged to a beaker and 12 grams (0.21 mole) of potassium hydroxide pellets added with stirring until dissolved. Then 374 grams (12.48 moles) of paraformaldehyde calculated as 100% formaldehyde were added rapidly while allowing the heat of the reaction to rise to 85° C. After stirring for about 15 minutes, the homogeneous melt was poured into trays where the product crystallized rapidly. A thermometer in the freezing mass indicated a freezing point of 73.5° C. The total weight of the product was 1446 grams.

The various lactams which are utilized in the preparation of N-methylol-lactams in accordance with the foregoing procedure are the following:

2-pyrrolidone
5-methyl-2-pyrrolidone
5-ethyl-2-pyrrolidone
3,3-dimethyl-2-pyrrolidone
3-methyl-2-pyrrolidone
3-ethyl-2-pyrrolidone
4-methyl-2-pyrrolidone
4-ethyl-2-pyrrolidone
α-piperidone
caprolactam
3-morpholone
5-methyl-3-morpholone
2,6-dimethyl-3-morpholone The following examples will serve to illustrate the preparation of the surface active ethers of N-(hydroxymethyl) lactams. It is to be understood, however, that these examples are merely illustrative and are not to be considered as being limitative of the invention disclosed and claimed.

*Example I*

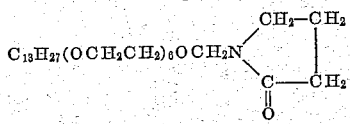

Into a 500 ml. flask equipped with a thermometer, stirrer and condenser, were placed 70 grams, 0.155 mole, of tridecyl alcohol condensed with 6 moles of ethylene oxide, 18.3 grams, 0.155 mole of N-methylol pyrrolidone and 3.0 grams of p-toluenesulfonic acid monohydrate.

The reaction mixture was heated to 90° C. and held at this temperature for a total of 5 hours. The clear homogeneous light amber liquid product was neutralized by the addition of 1.9 ml. of tributylamine.

Analytical determination of the unreacted hydroxyl content showed that the reaction was 86% complete. This product was found to be very stable when tested at 5% concentration with solid caustic at 50° C. for at least one week, (the duration of the test).

*Example II*

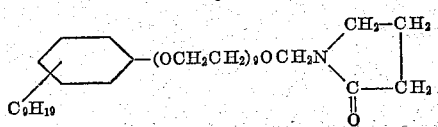

In a manner similar to Example I, 63.3 grams, 0.1 mole of nonylphenol condensed with 9 moles of ethylene oxide, 18.3 grams, 0.155 mole of N-methylol pyrrolidone and 1.9 grams of p-toluenesulfonic acid monohydrate were heated together for 6 hours at 90° C. At the end of this time the determination of the unreacted hydroxyl content showed that the reaction was 86% complete. The product was neutralized with diethanolamine. This product produced only 430 ml. foam as compared to 910 ml. produced by the parent ethoxylated nonylphenol in the same test.

The Shaker Foam B Test utilized in this example consists of the following: One gram of the active material is made up to 200 ml. of solution with water. 100 ml. of this is used for the first concentration. The remaining 100 ml. of solution is diluted to 200 ml. with water and 100 ml. of this solution is used as the second concentration. Subsequent dilutions are made in the same manner until 7 concentrations each having 100 ml. have been prepared. These solutions are placed in a series of 7–22 ml. graduated, stoppered cylinders and turned on a shaker through an angle of 180° for a period of 18 revolutions. The volume of foam in each tube is read in mls., then added giving a foam value to that particular material.

*Example III*

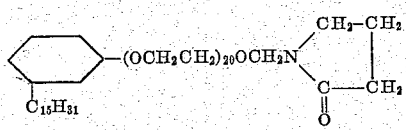

In a manner similar to Example I, 118.4 grams, 0.1 mole of 3-pentadecylphenol condensed with 20 moles of ethylene oxide, 18.3 grams, 0.155 mole of N-methylol pyrrolidone and 2.0 grams of p-toluenesulfonic acid monohydrate were heated together at 90° C. for a total of 10 hours. This surface active agent was stable at 5% concentration with solid caustic at 50° C. for one week.

*Example IV*

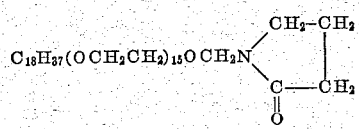

In a manner similar to Example I, 93.1 grams, 0.1 mole of octadecyl alcohol condensed with 15 moles of ethylene oxide, 13.3 grams, 0.1 mole of N-methylol pyrrolidone and 3.0 grams of p-toluenesulfonic acid monohydrate were reacted together at 90° C. for 5 hours. This surface active agent was stable at 5% concentration with solid caustic at 50° C. for one week.

*Example V*

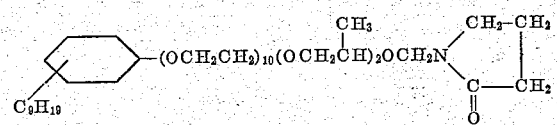

In a manner similar to Example I, 77.2 grams, 0.1 mole of nonylphenol condensed with 10 moles of ethylene oxide and 2 moles of propylene oxide, 18.3 grams, 0.155 mole of N-methylol pyrrolidone and 3.0 grams of p-toluenesulfonic acid monohydrate were reacted together at 90° C. for 7 hours.

This low foaming surface active agent was stable at 5% concentration with solid caustic at 50° C. for one week.

*Example VI*

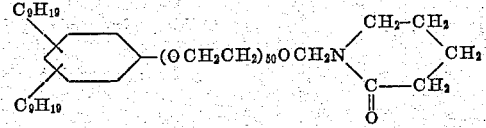

In a manner similar to Example I, 254.6 grams of dinonylphenol condensed with 50 moles of ethylene oxide, 12.9 grams, 0.1 mole of N-methylol-α-piperidone and 3.0 grams of paratoluene sulfonic acid monohydrate were reacted together at 90° C. for 12 hours.

This low foaming surface active agent was stable at 5% concentration with solid caustic at 50° C. for one week.

*Example VII*

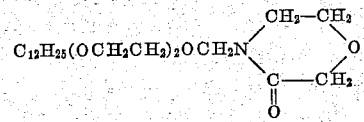

In a manner similar to Example I, 27.4 grams of dodecyl alcohol condensed with 2 moles of ethylene oxide, 13.1 grams of N-methylol-3-morpholone and 2.0 grams of p-toluene sulfonic acid monohydrate were heated to 90° C. and held at this temperature for a total of 6 hours. The clear homogeneous light amber liquid product was neutralized by the addition of 1.5 ml. of triethanolamine.

This low foaming surface active agent was stable at 5% concentration with solid caustic soda at 50° C. for 7 days.

*Example VIII*

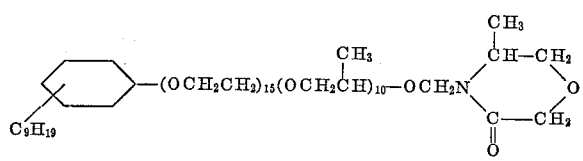

In a manner similar to Example I, 144.0 grams of nonylphenol condensed with 15 moles of ethylene oxide, and 10 moles of propylene oxide, 14.5 grams, 0.1 mole of N-methylol-5-methyl-3-morpholone and 2.0 grams of p-toluene sulfonic acid monohydrate were reacted together at 90° C. for a period of 10 hours. The clear homogeneous light amber liquid product was neutralized by the addition of 1.0 ml. of diethanolamine. This product was found to be very stable when tested at 5% concentration in solid caustic at 50° C. for at least one week.

All of the foregoing surface active ethers of N-(hydroxymethyl)-lactams are readily adaptable for mixing with alkali metal hydroxides and alkali metal silicates, including common fillers or soap builders to yield non-discoloring and non-foaming surface active compositions having manifold cleaning operations such as in the cleaning of metals of all types prior to plating, fabricating and processing, and in the washing of glass, dishes, bottles, and the like.

While the foregoing examples have been directed to the preparation of the new class of surfactants employing N-(hydroxymethyl)-lactams as one of the reactants, we have also discovered that imidazole, morpholine, 2-oxazolidone, 5-methyl-2-oxazolidone, 5-ethyl-2-oxazolidone, gamma-piperidone, pyrrolidine, 3-pyrroline, pyrazole, 5-pyrazolone, 2-pyrrolone, 2-pyrazoline and pyrrole are reactive with formaldehyde to yield N-methylol derivatives which are useful in the condensation with any one of the polyethoxylated phenols, polyethoxylated aliphatic alcohols and mixed polyglycol monoethers to yield a new and useful class of non-foaming surfactants having excellent stability in the presence of alkaline material.

We claim:

1. A chemical compound having the following formula:

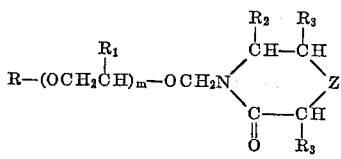

wherein R represents a member selected from the class consisting of alkyl of from 8 to 18 carbon atoms, phenyl and naphthyl groups, said phenyl and naphthyl groups substituted by 1 to 2 alkyl groups of from 8 to 18 carbon atoms, $R_1$ represents a member selected from the class consisting of hydrogen and methyl, $R_2$, $R_3$ and $R_4$ represent members selected from the class consisting of hydrogen, methyl and ethyl, Z represents a member selected from the class consisting of a single bond, —$CH_2$— and —O—, and $m$ represents an integer of from 2 to 100.

2. The chemical compound of the formula:

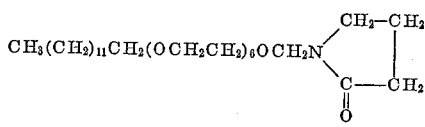

3. The chemical compound of the formula:

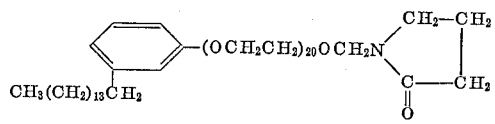

4. The chemical compound of the formula:

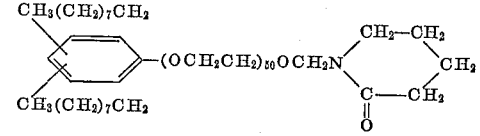

5. The chemical compound of the formula:

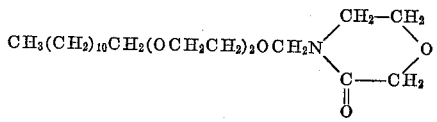

6. The chemical compound of the formula:

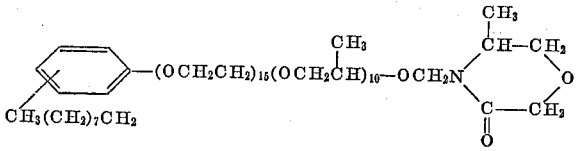

References Cited in the file of this patent

UNITED STATES PATENTS

| | | |
|---|---|---|
| 2,115,250 | Bruson | Apr. 26, 1938 |
| 2,170,111 | Bruson | Aug. 22, 1939 |
| 2,191,922 | Bruson | Feb. 27, 1940 |
| 2,287,465 | Bock | June 23, 1942 |
| 2,800,487 | Mark | July 23, 1957 |
| 2,941,967 | Moller et al. | June 21, 1960 |